US005261118A

United States Patent [19]

Vanderspool, II et al.

[11] Patent Number: 5,261,118

[45] Date of Patent: Nov. 9, 1993

[54] SIMULCAST SYNCHRONIZATION AND EQUALIZATION SYSTEM AND METHOD THEREFOR

[75] Inventors: Jan P. Vanderspool, II, Woodstock; Steven A. Goreham, Mount Prospect, both of Ill.

[73] Assignee: Motorola, Inc., Schaumburg, Ill.

[21] Appl. No.: 771,911

[22] Filed: Oct. 4, 1991

[51] Int. Cl.[5] .............................................. H04B 7/00

[52] U.S. Cl. ................................ 455/51.2; 455/12.1; 455/69; 375/107; 375/109

[58] Field of Search .................... 455/12.1, 13.2, 51.1, 455/51.2, 53.1, 69, 67.5, 67.6; 375/107, 108, 109

[56] References Cited

U.S. PATENT DOCUMENTS 3,128,465 4/1964 Brilliant ............................ 375/109
4,696,051 9/1987 Breeden ............................ 455/51.2
4,696,052 9/1987 Breeden ............................ 455/51.2
4,709,401 11/1987 Akerberg .......................... 455/51.2
4,709,402 11/1987 Akerberg .......................... 455/51.2
4,718,109 1/1988 Breeden et al. .................... 455/51.2
4,882,739 11/1989 Potash et al. ...................... 375/109
4,972,410 11/1990 Cohen et al. ....................... 455/33.4
5,014,344 5/1991 Goldberg ........................... 375/107

FOREIGN PATENT DOCUMENTS

0197556A2 10/1986 European Pat. Off. .
0198488A1 10/1986 European Pat. Off. .

*Primary Examiner*—Reinhard J. Eisenzopf
*Assistant Examiner*—Andrew Faile
*Attorney, Agent, or Firm*—Philip P. Macnak; Thomas G. Berry; Daniel R. Collopy

[57] ABSTRACT

A control station 12 initiates a system timing signal transmission which is re-transmitted from a satellite 14. In response to receiving the system timing signal, the control station 12 then generates a time correction factor which is distributed to a plurality of transmission stations 16, 18. The transmission stations 16, 18 in response to receiving the system timing signal transmission and the time correction factor distributed from the control station 12 generate a time adjustment factor which is used to correct the local transmission clocks 36, 36', thereby providing time synchronization of data transmissions generated from the transmission stations 16, 18.

35 Claims, 7 Drawing Sheets

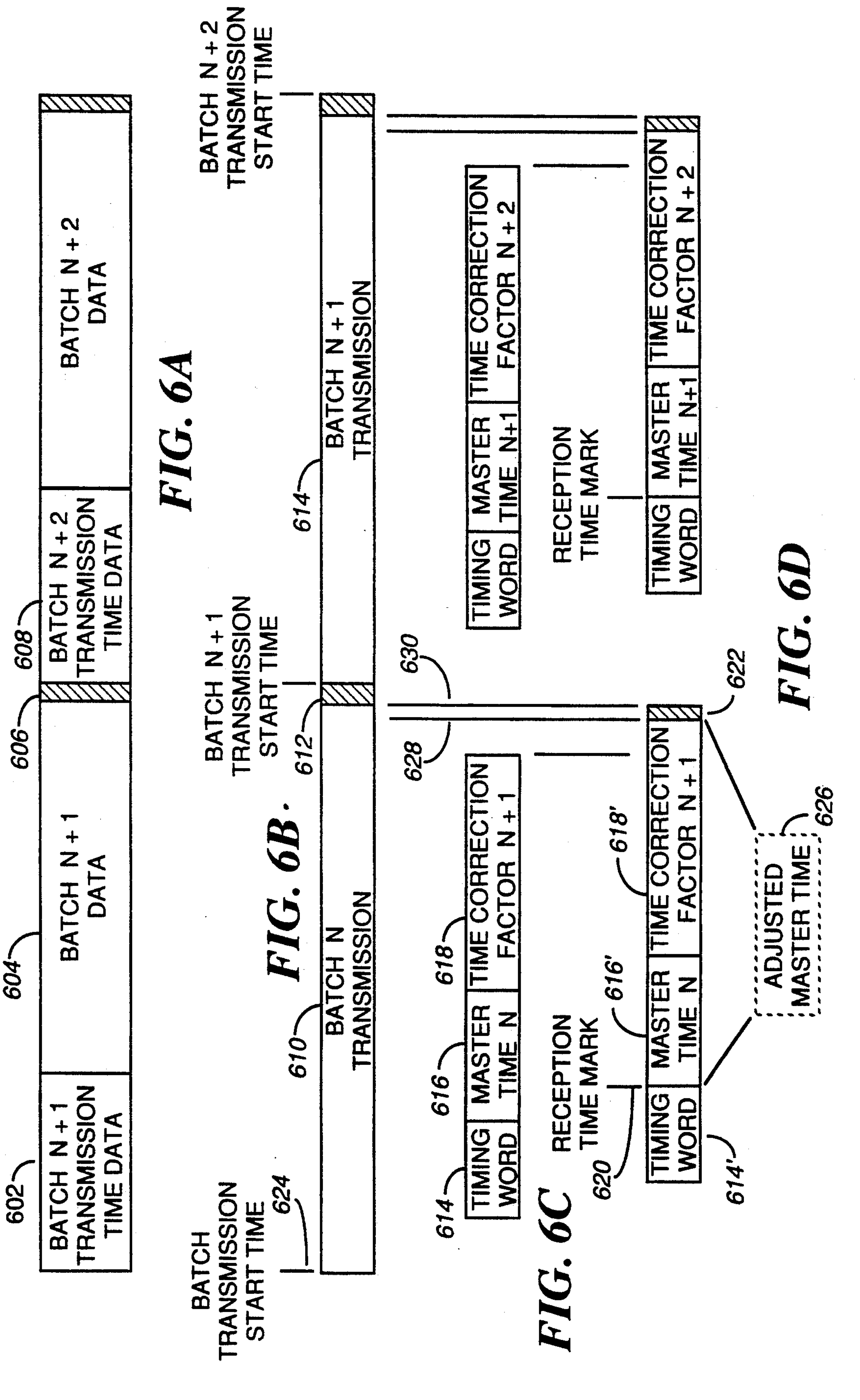
BATCH N + 1 TRANSMISSION TIME DATA
602
BATCH N + 1 DATA
604
606
BATCH N + 2 TRANSMISSION TIME DATA
608
BATCH N + 2 DATA
FIG. 6A
BATCH TRANSMISSION START TIME
624
BATCH N TRANSMISSION
610
612
BATCH N + 1 TRANSMISSION START TIME
BATCH N + 1 TRANSMISSION
614
BATCH N + 2 TRANSMISSION START TIME
FIG. 6B
TIMING WORD
MASTER TIME N
TIME CORRECTION FACTOR N + 1
614
616
618
628
630
TIMING WORD
MASTER TIME N+1
TIME CORRECTION FACTOR N + 2
RECEPTION TIME MARK
620
FIG. 6C
RECEPTION TIME MARK
TIMING WORD
MASTER TIME N
TIME CORRECTION FACTOR N + 1
614'
616'
618'
622
ADJUSTED MASTER TIME
626
TIMING WORD
MASTER TIME N+1
TIME CORRECTION FACTOR N + 2
FIG. 6D

SIMULCAST SYNCHRONIZATION AND EQUALIZATION SYSTEM AND METHOD THEREFOR

RELATED APPLICATION

This application is being filed of even date with related U.S. patent application Ser. No. 07/771,577 to Goreham et al. entitled "Simulcast Synchronization and Equalization System and Method Therefor".

BACKGROUND OF THE INVENTION

1. Field of the Invention

The present invention relates generally to the field of simulcast transmission systems, and more particularly to a simulcast system providing system clock synchronization and carrier frequency equalization.

2. Description of the Prior Art

The primary requirement for effective operation of simulcast transmission systems, such as used in simulcast paging systems, is to minimize the difference in audio phase delay in signals originating from two different transmission stations when received at the paging receiver. The audio phase delay can be minimized by requiring that different transmission stations transmit the same paging information at precisely the same point in time. Prior art paging systems have typically concentrated on equalizing the transmission path delay, including such elements as telephone lines, microwave links or RF links, which were used to connect the paging terminal to the transmission stations. In order to achieve such equalization of the transmission path delay, delay elements were introduced into the transmission path of those transmission stations closest to the source, or origin of the signal transmission, thereby providing a substantially uniform transmission path delay for all transmission stations throughout the system. Unfortunately, once such simulcast transmission systems were equalized, there was no guarantee the equalization would remain constant throughout any particular transmission period, because several of the transmission elements, particularly the telephone lines when they were not dedicated, were subject to variation throughout the transmission period.

In order to overcome the deficiencies noted above, several prior art simulcast transmission systems have utilized which has become known as a "store and forward" transmission technique, wherein the transmission data is stored at the individual transmission stations within the system and then broadcast, or forwarded, from all transmission stations at a predetermined time. Equalization of such systems have relied on the use of global positioning satellite systems which provided the accurate timing control necessary to control the timing of transmissions throughout the system. While such systems using global positioning satellites have proved effective in providing control of the transmission timing requirements, the advantages are provided at a substantial cost differential as compared to conventional simulcast transmission equalization systems.

There is a need to provide simulcast system equalization capability to without the use of a global positioning satellite system.

SUMMARY OF THE INVENTION

In accordance with one aspect of the present invention, a simulcast transmission system comprises a control station and a plurality of transmission stations. The control station comprises a first time generating means for generating system timing signals, a means for transmitting the system timing signals, a means for generating a time correction factor, and a means for distributing the time correction factor to the plurality of transmission stations. The plurality of transmission stations comprise a second time generating means for generating local timing signals, a means responsive to local timing signals for transmitting data, a means for receiving the transmitted system timing signals, a means for receiving the time correction factor, a means for comparing the received system timing signals and time correction factor with the local timing signals to generate a time adjustment factor signal, and a means which is responsive to the time adjustment factor signal for adjusting the timing of the second time generating means.

In accordance with another aspect of the present invention, a transmission station is provided which is capable of providing simulcast data transmission in a multiple transmission station communication system which has a control station for generating and distributing a time correction factor in response to receiving a transmitted system timing signal to the transmission station. The transmission station comprises a time generating means for generating local timing signals, a means responsive to local timing signals for transmitting data, a means for receiving the transmitted system timing signals, a means for receiving the time correction factor, a means for comparing the received system timing signals and time correction factor with the local timing signals to generate a time adjustment factor, and a means responsive to the time adjustment factor signal for adjusting the timing of said time generating means.

BRIEF DESCRIPTION OF THE DRAWINGS

FIGS. 6A-D are pictorial diagrams illustrating the system transmissions in accordance with the preferred embodiment of the present invention.

DESCRIPTION OF THE PREFERRED EMBODIMENTS

Figure 1:
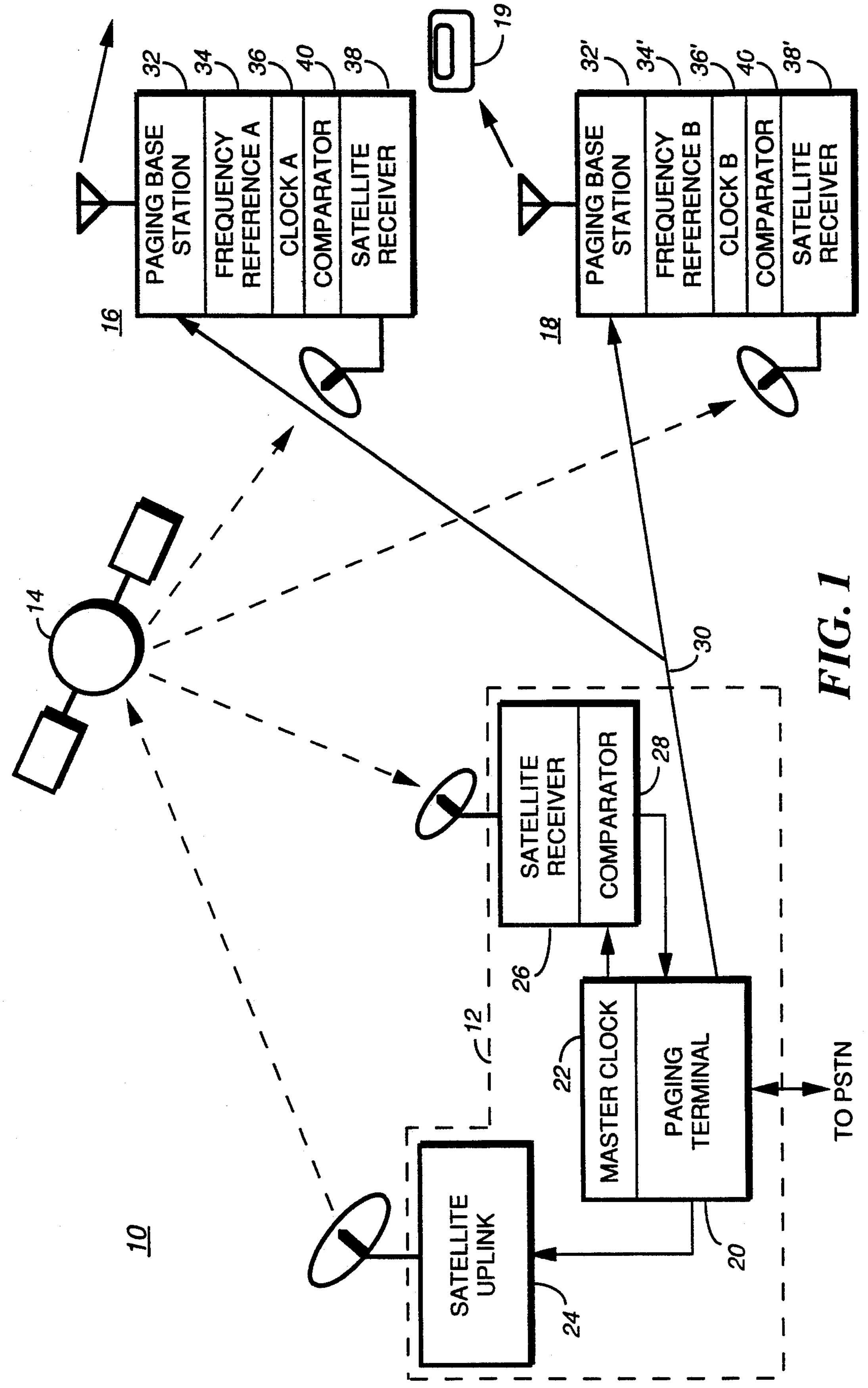
FIG. 1 is an electrical block diagram of a simulcast transmission system providing clock synchronization in accordance with the preferred embodiment of the present invention.

Referring to the diagrams, FIG. 1 is an electrical block diagram of a simulcast transmission system 10 in accordance with the preferred embodiment of the present invention. The system 10 includes a control station 12 for controlling the distribution of system timing signals used for transmission station clock synchronization and message transmission timing, a communication satellite 14, and a plurality of transmission stations, of which transmission stations 16 and 18 are shown for example only. The control station includes a paging terminal 20 which is used to process message information received over the public switched telephone network, PSTN, and to distribute such information, or data, to the plurality of transmission stations 16, 18 for transmission to selective call receivers, such as display pager 19, which is operational in the system. The operation of paging terminal 20 for collecting, processing and distributing message information is well known in the art. A master timing means, or clock, 22 is coupled to the paging terminal 20 and generates the system timing signals which are used to control the distribution of the message information, or data, and the distribution of synchronization information, as will be further described below. The paging terminal 20 couples to a satellite up-link transmitter 24 which transmits the system timing signals to the satellite 14 which then responds to receiving the system timing signals by retransmitting the system timing signals throughout the simulcast transmission system 10. The control station 12 also includes a satellite receiver 26 which is used to receive the system timing signals transmitted by the satellite 14. The system timing signals when received by the satellite receiver 26 are coupled to a comparing means, or comparator 28, which compares the time of arrival of the system timing signals with the time of transmission of the signals in order to establish a time adjustment factor which is then used to synchronize the transmission clocks used throughout the system, as will be further described below.

The paging terminal 20 also couples to the transmission stations 16, 18 through a communication link 30, such as provided through the public switched telephone network, or through RF or microwave links. The communication link 30 enables transmission of the message data between the control station and the transmission stations 16, 18 in a manner well known in the art. As will become more apparent in the description to follow, and unlike the prior art simulcast transmission systems which used GPS satellites for timing control, the communication link 30 can also be provided through the satellite 14 in an alternate embodiment of the present invention.

The transmission stations 16, 18 include paging base stations 32, 32' which are utilized to transmit the message data throughout the simulcast transmission system in a manner well known in the art. Frequency references 34, 34' are provided which are coupled to the paging base station, and are utilized to establish, or control the carrier frequency of transmission of the message data. Also coupled to the frequency references 34, 34' are clocks 36, 36' which generate local timing signals which are used for controlling the transmission of the data received from the control station 12 as will be described further below. Satellite receivers 38, 38' are used to receive the system timing signals re-transmitted by the satellite 14. The system timing signals received by the satellite receivers 38, 38' are coupled to a comparing means, such as comparators 40, 40', which compare the time adjustment factor information established at the control station with the current time indicated by the clocks 36, 36' at each transmission station. The time adjustment factor information enables the transmission stations to correct the clock time differences between the control station and the individual transmission station transmission clocks 36, 36'.

Operation of the simulcast transmission system in accordance with the preferred embodiment of the present invention can be summarized as follows. The paging terminal 20 sends clock synchronization information generated by the master clock 22 to the transmission stations 16, 18 using a dedicated satellite channel. A time correction factor is generated at the control station in response to receiving the clock synchronization information transmitted as system timing signals by the satellite 14. The time correction factor determined at the control station 12 is used by the transmission stations 16, 18, together with system timing signal arrival information measured at each transmission station 16, 18 to calculate the time corrections necessary to synchronize the local clocks 36, 36' at each transmission station with the master clock 22 at the control station 12. By periodically resynchronizing the local clocks with the master clock, the simulcast transmission system in accordance with the present invention provides significantly improved control of message transmission time without the complexity or problems associated with audio signal equalization of the prior art systems. In addition, transmission frequency equalization can also be provided, as will be described below.

Figure 2:
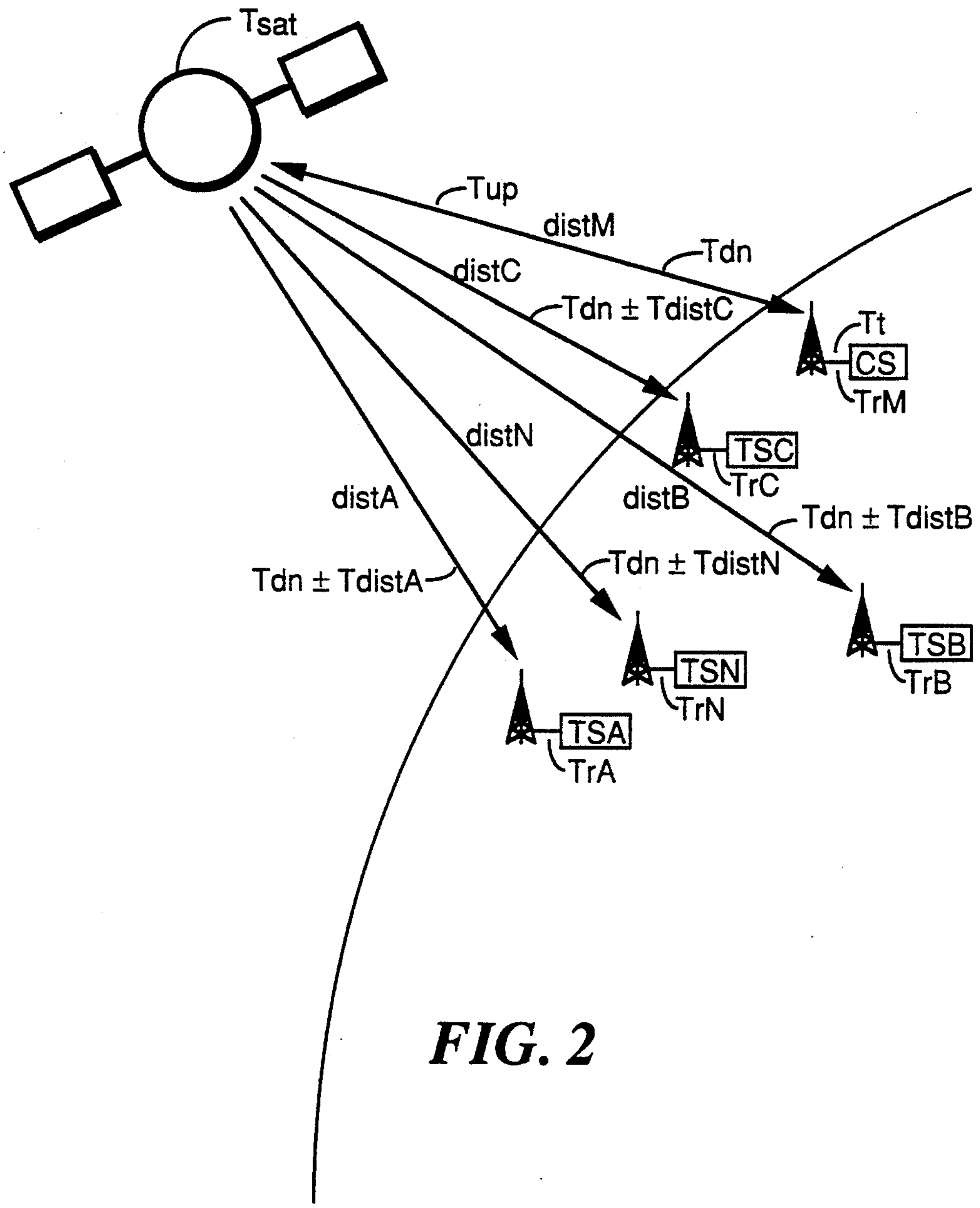
FIG. 2 is a timing diagram illustrating the timing considerations required to provide clock synchronization for the simulcast transmission system in accordance with the preferred embodiment of the present invention.

Reference is directed to FIG. 2 which is a pictorial diagram illustrating the simulcast transmission system in accordance with the preferred embodiment of the present invention. As shown in FIG. 2, the system includes a control station CS, and a plurality of transmission stations, indicated for example, TSA, TSB, TSC and TSN. The position and location of the control and transmission stations will depend on the area of coverage provided by the simulcast transmission system and can encompass a relatively small geographic area, such as required to provide coverage to an individual town or city, to a very large geographic area, such as covering a national, or continental transmission system.

As described above, system timing signals generated by the control station CS are transmitted to the satellite, which then re-transmits the signals. The control station monitors the actual time of transmission and time of reception of the system timing signals, which enables the time correction factor to be calculated as follows:

$$T_{cf}=T_{rec}-T_{xmit}$$

where $T_{cf}$ is the computed time correction factor value;

$T_{rec}$ is a second time value corresponding to the time of reception of the system timing signals at the control station CS; and $T_{xmit}$ is a first time value corresponding to the time of transmission of the system timing signals from the control station CS.

It will be apparent from the description above that the difference between the time of transmission and the time of reception provides a complete measurement of all path loss parameters, such as the delay through the satellite up-link transmitter $T_t$, the up-link transmission delay $T_{up}$, the satellite delay $T_{sat}$, the down link transmission delay $T_{dn}$, and the delay through the satellite receiver $T_{rM}$.

The satellite utilized in the preferred embodiment of the present invention is a geo-stationary satellite located at the equator, and providing a substantially fixed position relative to points on the surface of the earth, as is well known in the art. Thus the time correction factor indicated above can also provide for the measurement of additional transmission variables, such as variation in the satellite position and local geographic atmospheric conditions, just to name a few, as will be described below.

The system timing signals generated at the control station CS include a timing word which provides identification of a predetermined point in time, or time mark, where the measurement of time of transmission and time of reception are referenced. The system timing signals, in one embodiment, can include the actual time of transmission relative to the control station CS master clock, and the time correction factor calculated as described above, or in a second embodiment can include an adjusted time of transmission relative to the control station CS master clock which includes the established time correction factor. Each transmission station is then able to generate a time adjustment factor, as follows:

$$T_{adjN}=(T_{xmit}+T_{cf})-T_{recN}$$

where $T_{adjN}$ is the time adjustment factor value for the Nth transmission station; and $T_{recN}$ is the time value corresponding to the time of reception of the system timings signals at the Nth transmission station.

$T_{xmit}$ and $T_{cf}$ are as described above. When $T_{xmit}$ and $T_{cf}$ are transmitted separately, the computation as shown above is performed at the transmission stations, although as described above, the factor $T_{xmit}+T_{cf}$ can also be computed at the control station in which case only a single value identified as the adjusted time of transmission need be transmitted. Consequently, the term time correction factor can refer only to $T_{cf}$ in which case the time of transmission $T_{xmit}$ must also be provided, or can refer to $T_{xmit}+T_{cf}$ which includes both the time of transmission and the time correction factor, as defined above.

The time adjustment factor $T_{adjN}$ calculated as described above provides an indication of the the time indicated by the local clocks relative to the master clock. When the time adjustment factor $T_{adjN}$ calculated is negative, the local clock time leads the master clock time, indicating the local clock is currently running faster than the master clock at this measurement time interval. And when the time adjustment factor $T_{adjN}$ calculated is positive, the local clock time lags the master clock time, indicating the local clock is currently running slower than the master clock at this measurement time interval. Therefore, the amount and direction of correction of the local transmission station clocks relative to the master control station clock is readily provided.

As will be appreciated by one of skill in the art, the distance between the satellite and the control station CS and transmission stations TS can vary, especially where the distance between the control station CS and the transmission stations TS is large, or where significant differences in the elevation of one station relative to another exist, such as in mountainous terrain. Compensation for variations in the delay of the system timing signals are also accommodated in the preferred embodiment of the present invention by providing a distance correction factor which is stored at each of the transmission stations. It will be appreciated that when the simulcast transmission system covers only a relatively small geographic area and only encompasses a limited number of transmission stations, variations in the distance between the satellite and the individual transmission stations, can be insignificant, and therefore can be ignored.

When the distance between the satellite and the transmission stations becomes significant, the time adjustment factor can be calculated as follows:

$$T_{adjN}=(T_{xmit}+T_{cf})+T_{distN}-T_{recN}$$

where $T_{adjN}$ is the time adjustment factor value for an Nth transmission station including the distance correction factor, $T_{xmit}$, $T_{cf}$ and $T_{recN}$ are as described above; and $T_{distN}$ is the distance correction factor value corresponding to the distance between said satellite and said Nth transmission station. The distance correction factor $T_{distN}$ is preferably stored at the individual transmission stations.

In summary, a method of computing time adjustment factors for the individual transmission stations has been provided above. The method includes for the correction of the transmission delays encountered in the transmission of system timing signals between the control station and the transmission stations, and also provides for certain corrections which can be required due to such variations as due to environmental conditions and satellite position. By periodically adjusting the local clock times relative to the master clock time, as described above, simulcast transmission time equalization is provided.

While not specifically shown in the equations presented above, it will be appreciated that there can be additional transmission delays which can affect the adjustment of the local clocks relative to the master clock. Examples of such additional correctable delays include receiver delay differences between transmission stations due to such issues as cabling differences between the receiver antenna and the receiver. Other correctable delays include differences in the time of transmission between transmission stations, again due to such issues as cabling differences between the transmitter antenna and the transmitter. The additional correctable delays can be handled conventionally using fixed delay elements at each transmission station, although it is preferable that such delays be identified and added into any distance delays, thereby allowing additional adjustment of the time of transmission at the various transmission stations. In addition, additional timing offsets between transmission stations can be provided to compensate for differing transmitter powers within the system.

Figure 3:
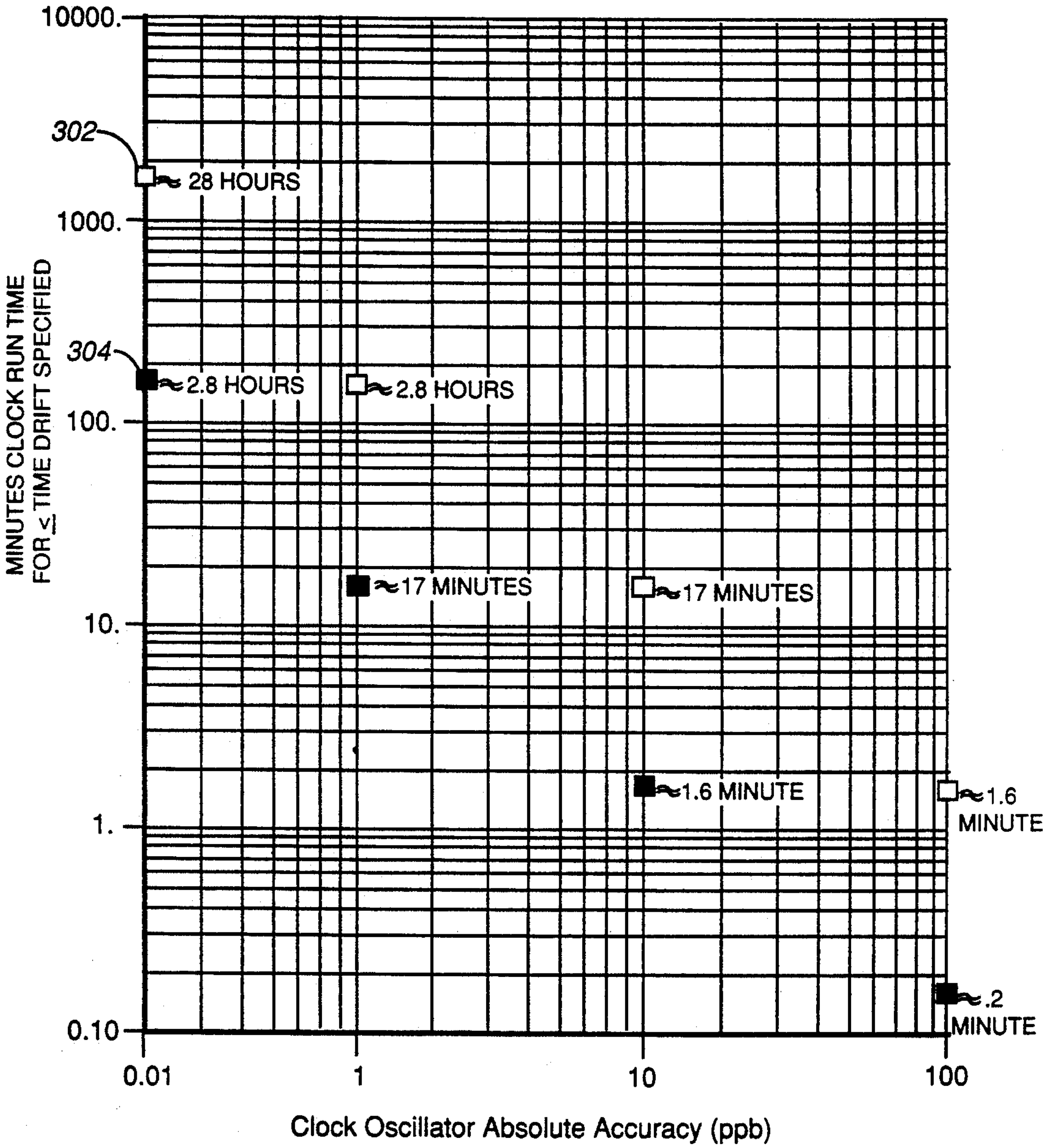
FIG. 3 is a graph depicting the accumulated clock time errors as a function of oscillator stability.

Reference is now directed to FIG. 3 which is a graph depicting the accumulated clock time errors as a function of oscillator stability which is utilized to determine the timing considerations for the periodic synchronization of the local clocks to the master clock in the preferred embodiment of the present invention. Data points indicated by box 302 represent maximum accumulated time errors of one microsecond, while data points indicated by box 304 represent maximum accumulated time errors of ten microseconds. FIG. 3 is best understood by way of example, such as that provided in TABLE I below which provides a comparison of the frequency of clock synchronization as a function the oscillator stability and the maximum accumulated system time error.

TABLE I

| Clock Oscillator Accuracy (ppb) | Max Accumulated Time Error (μS) | Run Time | Sync Interval |
|---|---|---|---|
| .1 | 1 | ~2.8 hrs | 1.4 hrs. |
| .1 | 10 | ~28 hrs | 14 hrs. |
| 1 | 1 | ~17 mins | 8.5 min. |
| 1 | 10 | ~2.8 hrs | 1.4 hrs. |

As shown in TABLE I, the run time is a function of both the clock oscillator absolute stability and the maximum accumulated time error allowable between the individual clocks within the system. The actual time between system synchronization cycles is actually one-half the run time shown, as two clock oscillators having the same absolute accuracy can accumulate the specified time error relative to each other in one-half the time since one can be drifting in a positive direction, while the other is drifting in a negative direction. It will be appreciated that the times represented are only approximate, and that the actual time is computed as shown below by dividing the Maximum Accumulated Time Error in μS by the Clock Oscillator Absolute Stability in ppb to determine the drift time in seconds which is then converted to minutes and hours in a manner well known in the art.

$$\text{Sync Interval} = \frac{\text{Max. Time Error}}{\text{Abs. Stability}} \text{ (sec)}$$

Clock oscillator accuracies of one part per billion can be readily achieved using high stability oven controlled crystal controlled oscillators. One such oscillator is the KXN 1130AA OCXO manufactured by Motorola Inc. can provide a stability of 2 ppb. Other oscillator stabilities can be provided by utilizing other oscillator types, such as rubidium frequency standards for stabilities in the 0.01 ppb range.

Figure 4:
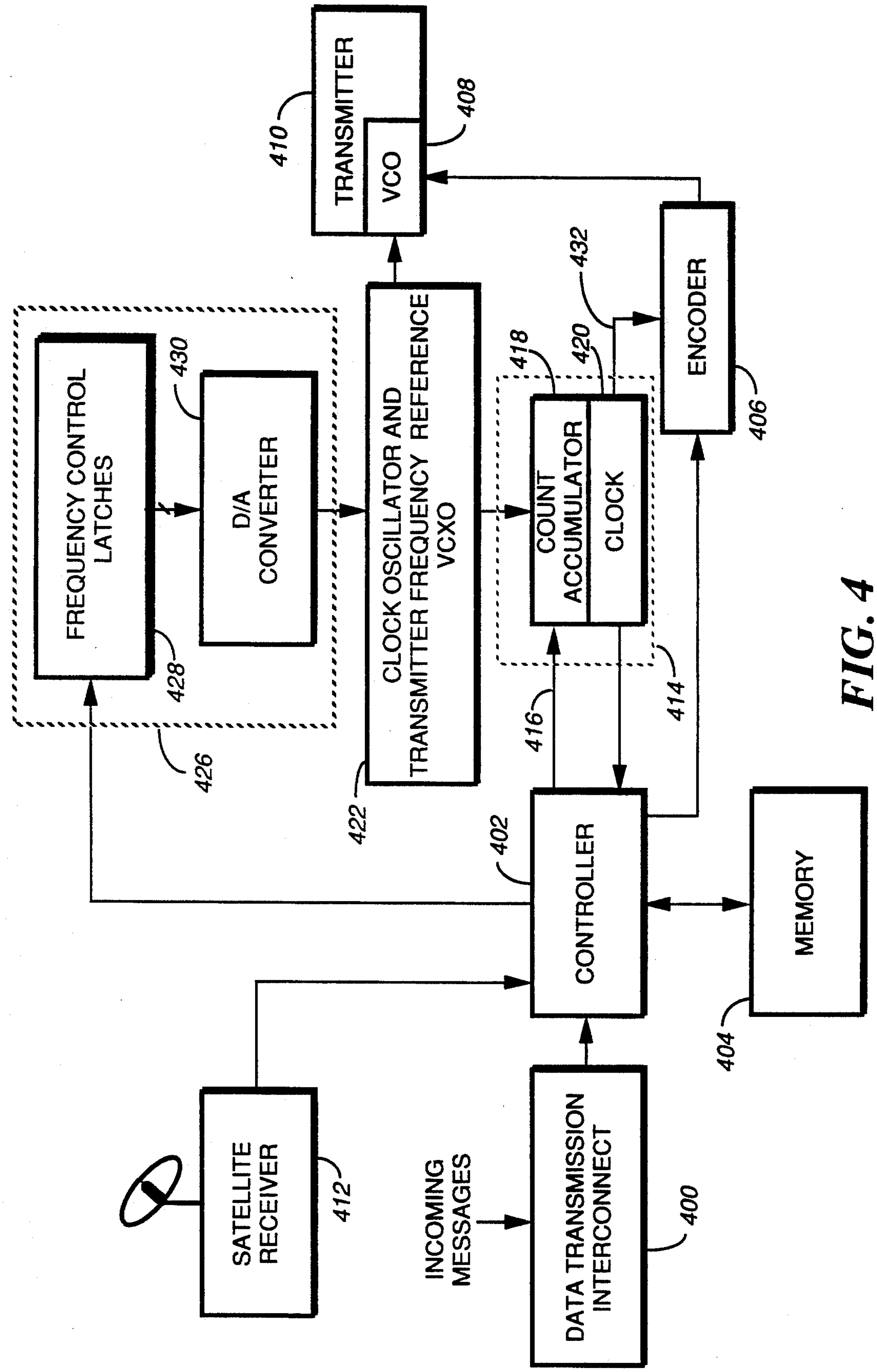
FIG. 4 is an electrical block diagram of a transmission station suitable for use with the preferred embodiment of the present invention.

FIG. 4 is an electrical block diagram of a transmission station suitable for use in the preferred embodiment of the present invention. As shown in FIG. 4, the transmission stations include a data transmission interconnect 400 which provides an interface between the transmission station and the communication link conveying the incoming messages from the control station. The data transmission interconnect 400 can provide any of a number of well known interface structures, such as a telephone interconnect and modem for use with the public switched telephone network, or a direct data input when interfacing with an RF or microwave link. The output of the data transmission interface 400 couples to an input of a transmission station controller 402. The controller 402 controls the total operation of the transmission station, performing such control operations as controlling the reception of data from the control station, controlling the reception of system timing signals from the satellite, controlling the time synchronization of the local clock, and controlling the transmission of the data received from the control station. The controller 402 can be implemented using a microcomputer, such as an MC68030 microcomputer, or a digital signal processor, such as a DSP 65000 digital signal processor, both of which are manufactured by Motorola, Inc, or other microprocessors or digital signal processors. The choice of microcomputer or digital signal processor is dependent upon the level of signal processing to be ultimately handled by the controller 402. Also coupled to the controller 402 is a memory 404 which is used to store the data received from the control station prior to data transmission. The memory 404 can be any suitable form of random access memory, such as integrated dynamic random access memory (DRAM), a hard disk drive, or a combination thereof, just to name a few. The memory 404 can also include a read only memory section, such as provided by an electrically erasable programmable read only memory which is used to store routines used by the microcomputer or DSP to control transmission station operation, and which is also used to store the time correction factor for distance from the satellite, as previously described above. One output of controller 402 is coupled to an input of encoder 406 which encodes the data recovered for transmission into one of a number of signaling protocols, such as the POCSAG signaling format or the Golay Sequential Code signaling format, although it will be appreciated that any other signaling protocol could be encoded as well. The output of the encoder 406 is coupled to the modulation input of the transmitter voltage controlled oscillator 408 which modulates the VCO 408 in a manner well known in the art. It will be appreciated that the controller and clock outputs can also be coupled to other types of modulators, such as a direct digital synthesized modular, as well. The output of the VCO 408 couples the modulated carrier signal to the transmitter which then amplifies the signal to a suitable power level for transmission.

Also coupled to the controller 402 is the satellite receiver 412 which is used to receive the system timing signals, as described above. The output of the satellite receiver is coupled to an input of the controller 402 which monitors the received timing word to detect the synchronization time mark. Upon detection of the synchronization time mark, the controller recovers the current time generated by the local clock 414, and further controls the reception of the time correction factor information generated at the control station. The controller includes a means for comparing, such as a comparator or the arithmetic logic unit of the microcomputer or DSP, and compares the current, or local time value, with the received time correction factor, and when necessary recovers the distance correction factor from the memory 404 to derive the time adjustment factor used to correct the local clock.

The local clock 414 is preferably a real time clock which comprises a count accumulator 418, which is preferably a frequency divider for dividing the clock oscillator output of frequency reference 422, although it will be appreciated other well known techniques would be required to generate non-integer frequency rates from the reference. The output of the count accumulator is decoded by clock circuit 420 to generate local timing signals, and more particularly, which generates the predetermined time intervals between clock synchronization cycles, and the particular clock timing signals used to control the operation of the transmission station. A real time clock output is also generated which is used to trigger the start of data transmission at the predetermined batch transmission start times to be described below. The local clock can alternately be implemented as a non-real time clock using dividers, as described above, to generate the required timing signals with a portion of the dividers forming the count accumulator 418 and functioning as an interval timer, the period of which represents the maximum time interval between clock synchronization cycles. In either instance, the time represented by the count accumulator 418 is advanced or retarded depending upon the time adjustment signal generated via a clock adjust output which is coupled to an adjustment input of the count accumulator 418.

A second output 424 of the controller 402 couples the clock adjustment information to the input of a reference frequency correction means 426 and is used to provide maintenance of the clock accuracy by compensating for the aging of the oscillator, which for an ovenized crystal controlled oscillator such as the KXN1130AA is ±30 parts per billion per year. The reference frequency correction means includes frequency control latches 428 which are used to store the clock adjustment information between clock synchronization events. The output of the frequency control latches is coupled to an input of a digital to analog converter which converts the digital frequency adjustment information into an analog adjustment signal which is coupled to an adjustment input of the frequency reference 422. In the preferred embodiment of the present invention, the D/A converter 430 has a twelve bit resolution to provide the necessary resolution for correction of the reference frequency. The clock oscillator and transmitter frequency reference 422 is preferably an ovenized voltage controlled crystal oscillator (OVXCO) for use in the transmission stations which would provide clock synchronization intervals of on the order of eight and one-half minutes, as described above. The ovenized voltage controlled crystal oscillator (OVXCO) also provides a frequency reference output which is coupled to a second input of the VCO 408, as shown.

Because the rate of aging is significantly less than the time error accumulated, the time interval between frequency compensation events to compensate for aging can be significantly longer than required to correct clock error. As a result, while clock error compensation is periodically required at relatively short time intervals, the frequency compensation can be provided at significantly longer time intervals between compensation events, such as daily, weekly, or even monthly as required.

Figure 5:
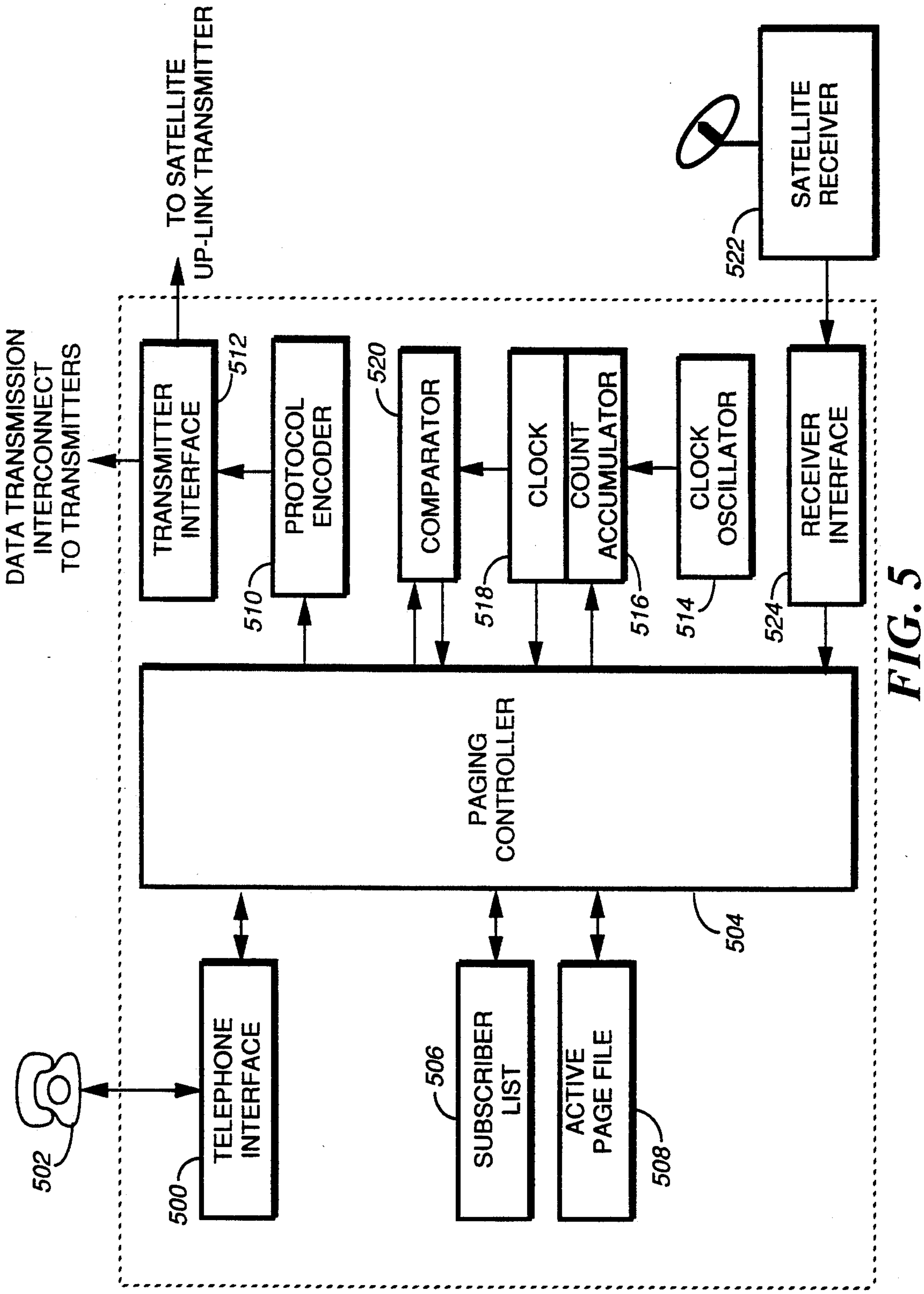
FIG. 5 is an electrical block diagram of a control station suitable for use with the preferred embodiment of the present invention.

Reference is directed to FIG. 5 which is an electrical block diagram of the control station 12. The control station 12 includes a telephone interface 500 which is coupled to the public switched telephone network over which message information is received from one or more input devices, such as a telephone 502, or data entry devices. A paging controller or other controller, such as utilized in queued transmission communication systems 504, is coupled to the telephone interface 500 and controls the processing of the message information as the information is received. A subscriber list memory is provided which stores information identifying the active subscribers belonging to the system, pager addresses and any other information which is required to identify the subscriber's receiver or the receiver's operation. As the message information is received, the paging controller 504 routes the message information to a message queue in an active page file memory 508 where the message information is temporarily stored prior to distribution to the transmission stations. At periodic time intervals, to be described below, the message information stored in the active page file is recovered by the paging controller 504 and is processed by a protocol encoder 510 which encodes the message information in a format suitable for transmission. The output of the protocol encoder 510 is coupled to a transmitter interface 512 which then couples the encoded message information to the respective communication link for distribution to the transmitter stations. The operation of the control station, as described above for receiving, processing and distributing message information, such as used in paging, and is well known in the art.

A clock oscillator 514 generates timing information which is coupled to a count accumulator 516, which together with the clock 518 is utilized to generate the system timing signals. In the preferred embodiment of the present invention, the count accumulator 516 provides an interval timer function, as described above, which indicates the occurrence of the next synchronization cycle. When the next synchronization cycle is indicated by the count accumulator 516, the paging controller formats a synchronization packet which includes a timing word and the current time of transmission which is retrieved from the master clock 518. The timing word and time of transmission information are coupled by the paging controller 504 to a transmitter interface 512 which couples the information to the up-link transmitter. Information present on the satellite channel is monitored by the satellite receiver 522 which couples the information to the paging controller 504 through receiver interface 524. When the timing code word is received and the transition indicating the synchronization time mark is detected, the time of reception is retrieved from the master clock and compared with the time of transmission to determine the time correction factor which is then distributed to the transmissions stations as described above.

Reference is directed to FIG. 6 which is a timing diagram illustrating the operation of the simulcast transmission system in accordance with the preferred embodiment of the present invention. As shown in FIG. 6A, a data channel is provided for the periodic distribution of message information stored in the active page file memory of the control station to the "store and forward" memory of the transmission stations. The information provided over the data channel includes preferably a batch transmission time during time interval 602, and batch data transmission during time control 604. Time interval 606 represents a non-transmission time interval which can occur because of the different distances which exist between the control station and the transmission stations, and also is representative of the difference in data transmission rates which are provided over the data channel versus the paging channel, such as, for example, 1200 bps (bits per second) on the paging channel versus 6000 bps on the data channel.

A paging channel, shown in FIG. 6B, provides for the periodic transmission of the batch data during time interval 610. A non-transmission time interval 612 occurs because the transmission start time word is not transmitted and also allow for any system delay which is required prior to the start of the next batch transmission. It should be noted that when the transmission stations operate in a "store and foreword" mode, the batch data, such as the batch data transmission during time interval 604, arrives at the transmission station before the start of transmission and is stored. The batch transmission during time interval 614 on the paging channel would represent the transmission of a previously stored batch such as received during time interval 604. The total transmission time between synchronization events is determined by the stability of the transmission station clocks, as described above.

During the time that data is being transmitted on the paging channel and message information is distributed to the transmission stations on the data channel, a synchronization packet, shown in FIG. 6C is transmitted on the satellite channel 612 and includes a timing word transmitted during time interval 614, a master clock time transmitted during time interval 616 and time correction factor transmitted during time interval 618 as previously described above, or in the alternate the adjusted master clock time of transmission during time interval 626, also as described above.

As shown in FIG. 6D, the transmitted synchronization packet containing information transmitted at time interval are received at the transmission stations, and are delayed in time due to the satellite up-link and down-link transmission times. When the synchronization packet is received at the transmission stations, and the reception time mark 620 is detected within the timing word during time interval 614', the local clock value is retrieved as described above. The local clock value recovered is then compared with the received master clock time of transmission value during time interval 616' and the time correction factor value during time interval 618', or in the alternate, the adjusted master clock time of transmission during time interval 626, in order to determine the local clock time adjustment factor. As further shown in FIG. 6D, there is generally a variation in the final time of reception of the synchronization packet indicated by time interval 622 at each transmission station due largely to the distance variations between the satellite and transmission stations. Following the reception of the synchronization packet at each of the transmission stations, the local clocks are adjusted, and as shown the earliest transmission stations beginning the clock adjustment at a time indicated by timing line 628, and the latest transmissions stations beginning the clock adjustment at a time indicated by timing line 630. In the preferred embodiment of the present invention, when the stability of the control station and transmission stations clocks are similar, the time deviation between clocks remains within the maximum accumulated time error for the system. The time of occurrence of the actual clock realignment is not critical and the clock synchronization can be performed simultaneous to the transmission of the data, with the time accumulator value being incrementally retarded or advanced, as will be described further below. When a lower stability clock is used at the control station in comparison to the transmission stations, the accumulated time error between the control station and the transmission stations will be greater than the maximum allowable time error, even though the accumulated time error between transmission stations is within the maximum allowable accumulated time error. This would occur whenever the stations are told to realign to a clock time outside the allowable clock error. In the second embodiment, the clock is adjusted in two steps. Starting at a time which could be specified on the satellite channel 706 (not shown; if the spread in time of arrival 622 is small enough, the time could be gated off the time-mark arrival), the time to the next data sample output is adjusted by the time correction factor. At the next data sample, the time is instantaneously changed to the adjusted master time. It is assumed that the time adjustment factor is smaller than the data sample rate.

The advantage of keeping accurate time at the control provides for minimizing the amount of data that must be stored at the stations to assure that the stations always have the data before transmission must start. The measurement of the time correction factor at the control and the use of the control as the master clock provide the means to assure that the control clock has the least relative error possible. However, any station may be used as the master as long as communication can be provided to all other clocks in the system and the satellite transmitted is located at that site. In addition, measurement of the time correction factor may be omitted and an approximate fixed number substituted adding only to the uncertainty of time of data arrival at the stations from the control due to the error of the fixed number and the variations which the measurement had accounted for as previously described.

Figure 7:
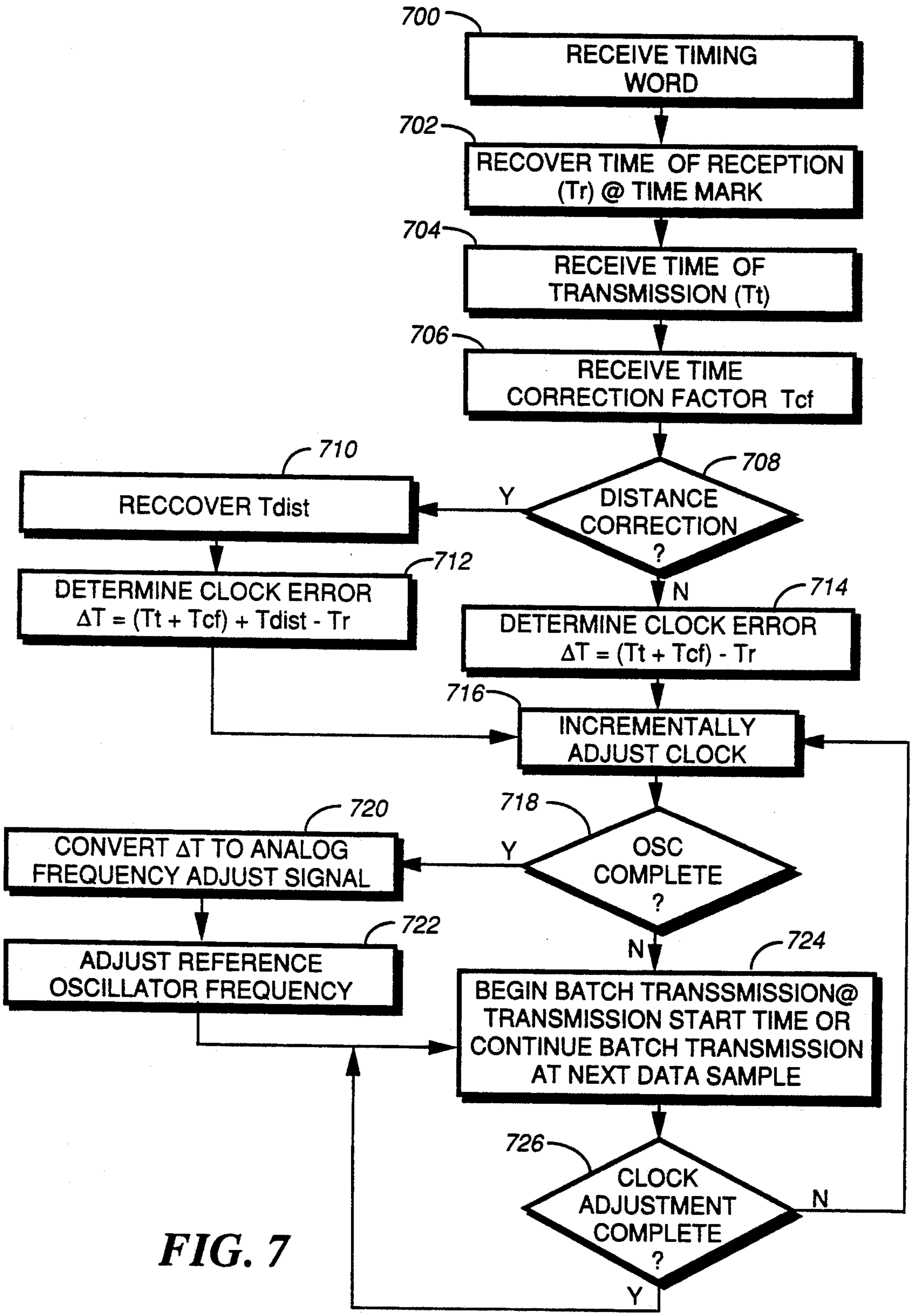
FIGS. 7 is a flow diagram describing the operation of the simulcast transmission system providing clock synchronization in accordance with the preferred embodiment of the present invention.

In a third embodiment, time interval 612 would represent an actual non-transmission time interval during which all transmission station clocks are abruptly readjusted to the new time values prior to the next batch transmission start time. In summary, it is readily possible for those skilled in the art to either adjust the clock simultaneously with the data transmission or to allocate a time period during which the paging channel may not be used to allow a clock adjustment cycle requiring time in excess of the data sample rate. FIG. 7 is a flow chart describing the clock synchronization operation at the transmission stations. As shown, the transmission stations receive the timing word at step 700, and at the time mark indicated by the timing word, the time of reception $T_{rec}$ is retrieved from the local clock at step 702. The time of transmission $T_{xmit}$ of the timing word is then received, at step 704, followed by the time correction factor value $T_{cf}$, at step 706. As described above steps 704 and 706 can also be combine into a single step when the adjusted master clock transmission time is transmitted. When a distance correction is required, at step 708, the value of the distance correction is recovered from memory, at step 710, and the clock error is calculated, as shown at step 712. When the distance correction is not necessary, at step 708, such as when a particular transmission station is at the same distance from the satellite as the control station, or that all transmission stations with the geographic area are at substantially the same distance, the clock error is calculated, as shown at step 714. Following the calculation of the clock error, the local clocks are incrementally adjusted at step 716 in the background of the data transmission. Following the incremental adjustment, the transmission station again continues the batch transmission at the next data sample at step 724 or begins the next data batch transmission at step 724. If the clock adjustment is not complete at step 726, steps 716 through 724 are repeated. When the clock adjustment is complete at step 726, the transmission station continues transmitting the next data samples at step 724.

In summary, synchronization timing information generated at the control station is periodically transmitted to the transmission stations, enabling the transmission station to periodically update the local clocks relative to the master clock at the control station. The synchronization timing information sent to each transmission station includes the master clock time (either the time in real time, or those bits significant in determining time differences, such as when an interval timer, or the like, is employed for the master and local clocks) which was recovered at the synchronization time mark. Also included in the synchronization timing information is the time correction factor established at the control station. The time correction factor is needed to correct for changes in the round trip time delay up to the satellite and back to the ground, and enables the transmission station local clocks to be precisely synchronized with the master clock. The synchronization time mark is a predetermined position in the received bit stream of the timing word which is used to trigger the recovery of the time of reception at the control station, and the current time at the transmission stations.

We claim:

1. A simulcast transmission system having means for time synchronizing the transmission of data signals therefrom, comprising:

a control station comprising first time generating means for generating system timing signals and for transmitting the same, means for receiving the transmitted system timing signals, means for comparing the transmitted and received system timing signals to generate a time correction factor signal in response thereto, and means for distributing the time correction factor signal to a plurality of transmission stations; and each of said plurality of transmission stations comprising second time generating means for generating local timing signals, means responsive to local timing signals for transmitting the data signals, means for receiving the transmitted system timing signals, means for receiving the time correction factor signal, means for comparing the received system timing signals and time correction factor signal with the local timing signals to generate a time adjustment factor signal, and means responsive to the time adjustment factor signal for adjusting the timing of said second time generating means.

2. The simulcast transmission system according to claim 1, wherein said first time generating means comprises:

means for generating frequency reference signals; and master clock means, responsive to the frequency reference signals for generating the system timing signals.

3. The simulcast transmission system according to claim 1, wherein said second time generating means comprises:

means for generating frequency reference signals; and local clock means, responsive to the frequency reference signals for generating the local timing signals.

4. The simulcast transmission system according to claim 1, wherein said means for transmitting the system timing signals comprises:

satellite up-link transmitter means for transmitting the system timing signals to a satellite, said satellite having satellite receiving means for receiving the transmitted system timing signals, and satellite transmitter means, coupled to said satellite receiving means, for re-transmitting the received system timing signals.

5. The simulcast transmission system according to claim 4, wherein said means for transmitting the system timing signals further transmits the data signals and data transmission start time signals.

6. The simulcast transmission system according to claim 1, wherein said means for comparing the transmitted and received system timing signals comprises a microcomputer.

7. The simulcast transmission system according to claim 6, wherein the time correction factor signal includes a time correction factor value calculated by said microcomputer using $$T_{cf} = T_{rec} - T_{xmit}$$

where $T_{cf}$ is the time correction factor value, $T_{rec}$ is a second time value corresponding to the time of reception of the system timing signals, and $T_{xmit}$ is a first time value corresponding to the time of transmission of the system timing signals.

8. The simulcast transmission system according to claim 1, wherein said means for comparing the received system timing signals and time correction factor signal with the local timing signals comprises a microcomputer.

9. The simulcast transmission system according to claim 8, wherein the time adjustment factor signal includes a time adjustment factor value calculated by said microcomputer using $$T_{adjN} = (T_{xmit} + T_{cf}) - T_{recN}$$

where $T_{adjN}$ is the time adjustment factor value for an Nth transmission station, $T_{xmit}$ is the first time value corresponding to the time of transmission of the system timing signals, $T_{cf}$ is the time correction factor value, and $T_{recN}$ is a time value corresponding to the time of reception of the system timing signals at the Nth transmission station.

10. The simulcast transmission system according to claim 1, wherein the system timing signals include at least timing information corresponding to a predetermined time for the transmission of the data signals from said plurality of transmission stations and synchronization signals which include at least synchronization information identifying a predetermined time mark and data signal transmission time information corresponding thereto.

11. The simulcast transmission system according to claim 10, wherein the synchronization signals re periodically generated.

12. The simulcast transmission system according to claim 1, wherein said means for adjusting the timing of said second time generating means comprises:

means for storing a time adjustment factor value derived by comparing the received system timing signals and time correction factor signal with the local timing signals;

converter means, coupled to said storing means, for converting the stored time adjustment factor value into the time adjustment factor signal.

13. The simulcast transmission system according to claim 12, wherein said time adjustment factor value is a digital information sequence, and wherein said converter means converts the digital information sequence into an analog signal corresponding to the time adjustment factor signal.

14. The simulcast transmission system according to claim 1, wherein said transmissions stations further comprise means for storing a distance correction factor signal, and said means for comparing compares the received system timing signals and time correction factor signal with the local timing signals and a distance correction factor signal to generate the time adjustment factor signal.

15. The simulcast transmission system according to claim 14, wherein said transmissions station further comprises memory means for storing information, and wherein the distance correction factor signal includes a distance correction factor value which is stored in said memory means.

16. The simulcast transmission system according to claim 15, wherein said means for comparing the received system timing signals and time correction factor signal with the local timing signals and a distance correction factor signal comprises a microcomputer.

17. The simulcast transmission system according to claim 16, wherein the time adjustment factor signal includes a time adjustment factor value calculated by said microcomputer using $$T_{adjN}=(T_{xmit}+T_{cf})+T_{distN}-T_{recN}$$

where $T_{adjN}$ is the time adjustment factor value for an Nth transmission station, $T_{xmit}$ is the first time value corresponding to the time of transmission of the system timing signals, $T_{cf}$ is the time correction factor value, $T_{distN}$ is the distance correction factor value corresponding to the distance between said satellite and said Nth transmission station, and $T_{recN}$ is a time value corresponding to the time of reception of the system timing signals at the Nth transmission station.

18. A transmission station for use in a simulcast transmission system comprising a plurality of transmission stations which are capable of providing simulcast transmission of data signals, the simulcast transmission system having a control station which is capable of generating system timing signals, and in response thereto generating a time correction factor signal, and for distributing the time correction factor signal to the plurality of transmission stations, said transmission station comprising:

time generating means for generating local timing signals:

means, responsive to local timing signals, for transmitting the data signals;

means for receiving the transmitted system timing signals;

means for receiving the time correction factor signal;

means for comparing the received system timing signals and the time correction factor signal with the local timing signals to generate a time adjustment factor signal; and means responsive to the time adjustment factor signal for adjusting the timing of said time generating means.

19. The transmission station according to claim 18, wherein said time generating means comprises:

frequency reference generating means for generating frequency reference signals; and local clock means, responsive to the frequency reference signals for generating the local timing signals.

20. The transmission station according to claim 19, wherein said means for transmitting the data signals transmits the data signals at a predetermined transmission frequency.

21. The transmission station according to claim 20, wherein the predetermined transmission frequency is established by the frequency reference signals generated.

22. The transmission station according to claim 18, wherein said means for comparing the received system timing signals and the time correction factor signal with the local timing signals comprises a microcomputer.

23. The transmission station according to claim 22, wherein the time adjustment factor signal includes a time adjustment factor value calculated by $$T_{adj}=(T_{xmit}+T_{cf})-T_{rec}$$

where $T_{adj}$ is the time adjustment factor value calculated for the transmission station, $T_{xmit}$ is the first time value corresponding to the time of transmission of the system timing signals, $T_{cf}$ is the time correction factor value, and $T_{rec}$ is a time value corresponding to the time of reception of the system timing signals at the transmission station.

24. The transmission station according to claim 18, wherein the system timing signals include at least timing information corresponding to a predetermined time for data signal transmission from said transmission station and synchronization signals which include at least synchronization information identifying a predetermined time mark and data signal transmission time information corresponding thereto.

25. The transmission station according to claim 23, wherein said means for adjusting the timing of said time generating means comprises:

means for storing the time adjustment factor value;

converter means, coupled to said storing means, for converting the stored time adjustment factor value into the time adjustment factor signal.

26. The transmission station according to claim 25, wherein said time adjustment factor value is a digital information sequence, and wherein said converter means converts the digital information sequence into an analog signal corresponding to the time adjustment factor signal.

27. The transmission station according to claim 18 further comprising means for storing a distance correction factor signal, and said means for comparing compares the received system timing signals and time correction factor signal with the local timing signals and a distance correction factor signal to generate the time adjustment factor signal.

28. The transmission station according to claim 27 further comprising memory means for storing information, and wherein the distance correction factor signal includes a distance correction factor value which is stored in said memory means.

29. The transmission station according to claim 28, wherein said means for comparing the received system timing signals and the time correction factor signal with the local timing signals and the distance correction factor signal comprises a microcomputer.

30. The transmission station according to claim 29, wherein the time adjustment factor signal includes a time adjustment factor value calculated by $$T_{adj}=(T_{xmit}+T_{cf})+T_{dist}-T_{rec}$$

where $T_{adj}$ is the time adjustment factor value for said transmission station, $T_{xmit}$ is the first time value corresponding to the time of transmission of the system timing signals, $T_{cf}$ is the time correction factor value, $T_{dist}$ is the distance correction factor value corresponding to the distance between said satellite and said transmission station, and $T_{rec}$ is a time value corresponding to the time of reception of the system timing signals at said transmission station.

31. A method of time synchronizing data signal transmissions originating from a plurality of transmission stations operating within a simulcast transmission system, the transmission stations having transmission clocks for controlling the starting time of the data signal transmissions, said method comprising the step of:

generating, at a control station, a time correction factor signal in response to the control station generating and transmitting a system timing signal;

distributing the system timing signal and the time correction factor signal from the control station to the transmission stations;

generating, at the transmission stations, local time adjustment factor signals in response to receiving the system timing signal and the time correction factor signal;

adjusting the transmission clocks at the transmission stations in response to the local time adjustment factor signals generated.

32. The method of time synchronizing data signal transmissions according to claim 31 wherein said step of generating a time correction factor signal at the control station comprises the steps of:

transmitting, from the control station, the system timing signal which includes at least a timing word which provides a time mark indicating a time of transmission of the system timing signal;

receiving the system timing signal including the timing word at the control station to detect the time of reception of the system timing signal; and comparing the time of reception of the system timing signal with the time of transmission of the system timing signal to determine a value for the time correction factor signal.

33. The method of time synchronizing data signal transmissions according to claim 32, wherein said step of comparing comprises the step of calculating a value for the time correction factor signal according to the formula $$T_{cf}=T_{rec}-T_{xmit}$$

where $T_{cf}$ is the value for the time correction factor signal, $T_{rec}$ is a second time value corresponding to the time of reception of the system timing signal, and $T_{xmit}$ is a first time value corresponding to the time of transmission of the system timing signal.

34. The method of time synchronizing data signal transmissions according to claim 32 wherein said step of generating a time adjustment factor signal comprises the steps of:

receiving the system timing signal including the timing word at the transmission station to detect the local time of reception of the timing word; and comparing the local time of reception with the time of transmission of the system timing signal and the time correction factor to determine a value for the time adjustment factor signal.

35. The method of time synchronizing data signal transmissions according to claim 34, wherein said step of comparing comprises the step of calculating the value for the time adjustment factor signal according to the formula $$T_{adjN}=(T_{xmit}+T_{cf})-T_{recN}$$

where $T_{adjN}$ is the value for the time adjustment factor signal for an Nth transmission station, $T_{xmit}$ is the first time value corresponding to the time of transmission of the system timing signals.

$T_{cf}$ is a time value corresponding to the received time correction factor signal, and $T_{recN}$ is a time value corresponding to the time of reception of the system timing signals at the Nth transmission station.

* * * * *